UNITED STATES PATENT OFFICE.

WILLIAM STEVEN SELLARS, OF BROOKLYN, NEW YORK, ASSIGNOR TO AMERICAN CAN COMPANY, A CORPORATION OF NEW JERSEY.

VACUUM PROCESS FOR PRESERVING AND OTHER PURPOSES.

1,279,379.

Specification of Letters Patent. Patented Sept. 17, 1918.

No Drawing.

Application filed June 16, 1916. Serial No. 104,050.

*To all whom it may concern:*

Be it known that I, WILLIAM STEVEN SELLARS, a citizen of the United States, residing at Brooklyn, in the county of Kings and State of New York, have invented certain new and useful Improvements in Vacuum Processes for Preserving and other Purposes, of which the following is a specification.

This invention relates to the discovery of an improved method of treating food products to a vacumizing and permeating process, whereby a greatly improved product is produced, and many of the disadvantages and difficulties now attending the canning of fruits and vegetables are entirely eliminated or greatly lessened.

The most generally, widely used and commercially practical containers are made of commerical tin plate in very large numbers and by special automatic machinery. These tin containers are used almost universally throughout the canning industry, and are made up of sheet steel coated with pure block tin, so that metallic tin is in constant contact with the food products in the containers.

In the making of tin plate as it is called, an endeavor is made to treat the uncoated sheets of steel in such a manner that a perfect unbroken coating of pure tin will cover the entire surfaces of the sheets during the coating operation. A sheet of finished tin plate appears to the ordinary sight as being completely and thoroughly coated with tin, but in fact usually contains a great number of microscopic spots that are not covered with tin and that are more or less uniformly distributed all over the surfaces of the sheets, so that instead of the tin coating offering an unbroken protective surface to the steel sheets, these minute spots are exposed and come into direct contact with any products put into tin containers.

Almost all food products inclosed in tin containers produce some kind of action on the walls of the containers and in some instances this action is so energetic as to cause perforations that extend entirely through the walls, permitting the liquids to ooze out and air to enter and thus bring about the destruction of the container and deterioration of the contents.

This action is both chemical and electrolytic and requires the presence of oxygen in the can to permit its continued action. All fruits and vegetables, and in fact practically all food products, are somewhat porous and cellular and contain varying quantities of air and gas; the presence of this air and gas in a sealed container helps to produce the actions on the walls of the containers as above noted.

In ordinary methods of canning fruits, for example, the ripe fruit is placed in a container, sometimes hot and sometimes cold, is usually exhausted, sealed and subjected to a cooking or processing heat for a predetermined period and cooled. As the fruit is placed in the container a quantity of syrup or liquid is placed with it, and an effort is made to completely fill the can. After processing and cooling the cans, however, a certain shrinkage has taken place owing to a small quantity of the liquid surrounding the fruit entering the pores and cells of the fruit and replacing the air and gases expelled during processing, this air and gas occupying a space in the top of the can.

This interchange of air and liquid within the can continues for a long time after packing, with a continual shrinkage of the liquid, so that after some months a can that was completely full of liquid when packed will show a shrinkage in some instances of one quarter or more. This shrinkage is not uniform in all cans so that very irregular results are sometimes obtained.

As a result of the many experiments which have been made both in the laboratory and in packers' plants, there is one conclusion which may be safely drawn, and that is that the presence of oxygen in the can is detrimental in that it promotes chemical action. A familar example will serve to illustrate this point.

It is a well known fact to the layman that if two plates of dissimilar metals are immersed in an acid solution, and then are connected together, an electrolytic action takes place with the generation of an electric current and the solution of the negative plate. This action proceeds until the hydrogen which is formed in the electrolytic action collects on the positive plate, and thereby causes the action to cease. If there were some agent present to prevent this accumulation of hydrogen, and the consequent stoppage of the action, the electrolytic action would proceed until the negative plate was consumed. Agents of this sort are known as depolarizers, in that by uniting with the liberated hydrogen they prevent this accumulation on the surface of the positive plate and allow the action to proceed. Some familiar examples of depolarizers are: manganese dioxid, chromic acid, nitric acid, and similar oxidizing agents. It will be noted that all these substances depend for their depolarizing action upon the oxygen which they are capable of liberating. In the same way oxygen itself acts as a depolarizer, and, as in the case of a tin container, we have two dissimilar metals—iron and tin, which are in contact and immersed in a fruit acid solution, a mild electrolytic action takes place which is promoted by the depolarizing effect of any oxygen left in the can when it is sealed. Many laboratory experiments have been made to show that there is a gradual and steady disappearance of oxygen from cans, such as we describe, and that the attack upon the iron of the metal is greatly accelerated when oxygen is present in the can. It is significant also that the greatest effects of the contents of a can of acid fruit are to be noted along the water line, that is, the portion of the can where the air and liquid come in contact, due to the availability of the oxygen or the depolarizer at that point.

It is also a well known fact which has been substantiated experimentally that the development of vegetable and fruit products depends upon the absorption by the plant structure of carbon dioxid from the air, and its subsequent decomposition into carbon and its compounds and oxygen. This action is due to the substances of the plant structure itself, of which chlorophyl is a familiar example. It will be seen, therefore, that the gases which we will call air which are found in the porous structure of fruit products can be expected to contain more oxygen than the normal condition of the air due to this action in the development of the fruit itself. Moreover, during the ripening of fruit, chemical changes of a somewhat complicated nature occur, whereby the structure itself expands, and the acids and substituted acids of the fruit undergo a change whereby they are split up and partially converted into sugars. As in these fruit acids the proportion of oxygen to hydrogen is greater than in the corresponding sugars, as for example, fructose, and as oxygen itself is not directly absorbed by vegetable structures, it is evident that the gases which collect in the structure of fruit products due to the expansion of the cellular mass will be rich in oxygen, and will have a correspondingly greater depolarizing action than normal air. It becomes apparent then that in order to eliminate as far as possible the disastrous corrosive effects of acid food products upon metal containers, and particularly tinned receptacles comprising two or more metals, that every effort must be made to eliminate as far as possible all oxygen from the can. Numerous experiments have been made along different lines to accomplish this. One of the common methods in general use is the use of what are known as exhaust boxes, which are semi-closed containers through which the filled cans pass before sealing, and which are filled with steam. The object of the exhaust box is to heat the contents of the can thoroughly so that the head space of the can when sealed will be filled as far as possible with the water vapor which when the cans cool condenses leaving a partial vacuum. In the case of acid fruits this exhausting process cannot be continued too long, because of the softening effect of the heat upon the structure of the fruit itself. Moreover, while this exhausting process may more or less effectually remove or displace air in the head space of the can, it does not remove to any great extent the air which is included in the pores of the fruit itself. When the can is sealed, however, and then subjected to a sterilizing process, some of this air is cooked out and rises to the surface of the can, and the replacement of the air which has been removed from the fruit by the liquid in which it is packed causes the can to appear to have been improperly filled. It will be seen that this is disadvantageous for two reasons. It offsets the packer's endeavors to supply cans which are well filled, as, after this air expulsion and the absorption by the food product of liquid or the syrup to replace the air expelled, the cans appear to have been under-filled, and, as outlined above, the air which has been expelled has a tendency to promote chemical action at the point where the surface of the liquid comes in contact with the metal container due to the depolarizing effect of the oxygen which the air contains.

One of the most serious actions on the walls of a tin container due to the presence of oxygenated gases in the head space of a can occurs in canned apples, wherein complete perforation of the metal walls takes place in a comparatively few months, thus completely destroying the container and contents.

My improved method completely removes the air and gas from the cells of fruits and replaces them with a liquid or syrup before the fruit is sealed in the container and processed, and consequently there is no air or gas to expel from the fruit cells during processing and consequently no shrinkage after cooling and every can is completely full and remains so.

I will describe my method as applied to preparing and canning apples. The fruit is prepared as is ordinarily done, and placed in a vessel together with a liquid or syrup, preferably the same liquid or syrup as will be used when cans are finally sealed; while submerged in the liquid it is subjected to a vacuum. As soon as the vacuum begins to form the air and gas contained in the myriads of cells and pores of the fruit begin to expand and pass from the fruit, out through the liquid and out of the vessel. As the vacuum increases great quantities of air are drawn from the fruit as is evidenced by the effervescence and bubbling within the vessel. As soon as the bubbling ceases the vacuum is released and the contents of the vessel are restored to atmospheric pressure, when the liquid surrounding the fruit instantly flows into every cell and pore from which the air and gas were withdrawn, with the result that the submerged fruit is completely permeated with the liquid. If the fruit has been vacuumized in its permanent containers, more syrup is added, so as to completely fill the can, when it is permanently sealed and processed in the ordinary manner, after which no shrinkage within the can will take place, since there has been no air to expel from the cells of the fruit during processing.

If the fruit is to be treated in bulk, portable, open-mesh-work baskets are used; these are filled with prepared fruit and immersed in vacumm chambers containing sufficient liquid to completely cover the fruit. After vacuumizing and permeation, the baskets are removed from the treating chamber and the fruit filled into permanent containers together with a syrup to completely fill the containers, when they are sealed and processed in the regular manner, the processing, however, being shorter than ordinarily.

From the fact that each container can be completely filled with fruit and syrup or other suitable medium, and that no shrinkage occurs after processing, there is no head space left in the can which would consist in part of oxygen; therefore, the frequent pinholing of the walls of the container, above referred to, will be largely eliminated since pinholing seldom occurs below the surface of the liquid in the can.

Aside from the elimination of the deadly pinholing, other advantages accrue from the use of this process:

Apples subjected to a vacuum under the conditions related, take on a much improved appearance, having a more or less transparent look, and being much lighter and more nearly uniform in color throughout the container. Ordinarily the meat of apples oxidizes rapidly when exposed to the air during their preparation and handling prior to canning, this oxidization being greatest on the apples most freely exposed to the air; so that when finally placed within their permanent containers and sealed, the discoloration, due to this oxidization, varies in extent, some apples being browner than others. This varying color adds nothing to their appearance, but on the contrary gives them a rather dirty, dull color which, while it may not materially affect their quality, certainly affects their salability.

Every apple in a can subjected to my process takes on a bright clear color and remains so, since the liquid completely fills the can and there is no oxidizing agent present to cause discoloration. In the preparation of apples for my process the simple precaution of placing the peeled, cored and quartered apples into cold salt water, until they go to the vacuumizing machine, will arrest discoloration to such an extent that practically no discoloration appears after being vacuumized.

Another very important advantage accruing from the use of this process lies in the higher heat conductivity imparted in obtaining a proper process, in a marked diminution of time. Air is a slow conductor of heat compared to a liquid. Apples as ordinarily inclosed in cans prior to processing, containing in their cells all of their natural air and gas, require a high temperature applied for a sufficient time to bring the apples in the center of the can to the sterilizing temperature; this inclines to overheating the apples next to the walls of the cans and a breaking down of their structure. All of the heat which reaches the center apples must be conducted by the liquids, air and gases in their cells and pores. While apples subjected to my vacuumizing process, being completely saturated with the liquid syrup and having no air or gas retained in their cells and pores, will transmit heat to each other much faster and with much less resistance, and with much less tendency to break down the cell structure; in fact, the air and gas contained in the cell spaces of fruit offer the same insulation and resistance to the transmission of heat that air spaces offer to the transmission of heat in the wall of refrigerators and ice boxes, therefore, it is little wonder that packers have had difficulty in holding the fruits together and preventing destruction of their structure during the intense and prolonged heat application necessary to effect complete sterilization. This process will greatly facilitate sterilization because heat transmission will be rapid and effective and will not be retarded by any insulating medium in the cell spaces of the fruits.

In the smaller fruits that are usually canned whole, advantages accrue that have never been present in the ordinary methods. Take strawberries for example: A great amount of air and gas are naturally contained in their cells and being a delicate fruit their structure is easily impaired, the ordinary methods of canning them requiring a high heat and sufficient application to effect thorough sterilization, with the result that the berries become mushy and soft and lose much of their plump round shape and considerable of their bright, clear, red color, and still contain the larger part of their natural air, so that they have always floated in the liquid contents of the can. This buoyant tendency has worked further detriment in that the berries in the top of a can are constantly being pressed and squeezed by the buoyant berries underneath until in time they are flattened and distorted beyond all semblance of a palatable strawberry. My improved process extracts practically all of the air from the fresh and plump berries and by replacing it with a heavy liquid or syrup the berries have little or no buoyancy left and after processing retain their plump shape and bright color and do not crowd each other as is the case with unvacuumized fruit, since the heavy syrup overcomes somewhat the natural buoyancy and the berries therefore settle to the bottom of the container.

Another very important advantage accruing from the use of my process is the retention of the fugitive aroma and flavor of fruits that is many times completely lost by the ordinary methods. The air and gases exhausted from the cells of fruit by my method no doubt carry with them quantities of this elusive flavor, but, being compelled to pass through an absorptive liquid, much of this aroma is absorbed by the liquid and passes back into the fruit when the vacuum is released.

In order to keep a full strength flavor in the fruit it is only necessary to vacuumize the fruit immersed in its own juices; in this manner no aroma or flavor need be lost and in addition added flavors and aromas can be given to a fruit, thus intensifying the natural flavor or automatically producing mixed and combined flavors in a most simple and efficient manner and in a way that will be permanent and lasting.

Colors of fruits and vegetables can likewise be intensified or changed by simply supplying the desired color to the liquid in which the fruit or vegetable is immersed during vacuumizing.

Another advantage accruing from the use of my method lies in its application to the syruping, sugaring and glazing of fruits and other food products. Take figs for example: The ordinary method now used consists in cooking and soaking the figs for several separate periods of time in order to thoroughly saturate the fiber of the fruit with the heavy syrup, requiring considerable time and a comparatively large equipment.

By my vacuum method the figs would be placed in cold or hot syrup, vacuumized for a sufficient period to thoroughly exhaust the air and gases, and thereby fully expand the cells and pores, and then by releasing the vacuum cause the heavy syrup to instantly flow into every cell and pore of the figs, from which the air had been withdrawn, producing a much better article, more thoroughly permeated and in a fraction of the time.

Although I have enumerated many advantages growing out of the use of a vacuum in the handling of different products, it will be understood that I do not intend to claim broadly mere vacuumizing, or except where the elimination and prevention of accumulation of oxygen in the head space of the cans containing the material is the prime consideration.

By the expression "tin receptacle" in the claims appended hereto is meant a receptacle comprising two or more metals which when containing an electrolyte or acid content would be liable to electrolytic action, and also any receptacle which is subject to chemical or electro-chemical reaction between the material of the container and the contents of the can, induced or permitted by the presence of oxygen and other gases given off by said contents. The invention also contemplates the new and patentable article produced by the practice of the process.

What is claimed is:

1. The method of preventing pin-holing of tinned receptacles holding food products packed therein, comprising subjecting the food product to a vacuum while in a liquid, whereby substantially all free air or oxygen contained in the fruit is abstracted therefrom, thereupon completely filling the receptacle so that no free air space is left therein, and sealing the same.

2. A tinned receptacle holding food products which have been subjected to a vacuum while in a liquid to abstract substantially all free oxygen therefrom, said food product and its preserving liquid substantially completely filling said receptacle.

3. The method of packing cellular food products in metal walled containers to prevent shrinkage of the contents and pin-holing of the container walls; comprising confining the cellular food product in a vacuum chamber while wholly immersed beneath the surface of a liquid, whereby substantially all of the oxygen and other gases are drawn from the cells and tissues of the food product and expelled from the said chamber, then permitting free air to enter said chamber above the surface of said liquid whereby the liquid is caused to fill the air-free cells and tissues of the food product while immersed beneath the surface of the liquid and saturate the same, then completely filling metal walled containers with the saturated food product and liquid so that no free air space is left therein and then sealing the containers.

4. The method of packing apples in metal walled containers to prevent pin-holing or perforating of the metal walls; comprising subjecting apples to a vacuum while immersed in a liquid whereby substantially all free air contained in the cells of the apples is abstracted therefrom and replaced by the liquid in which they are immersed, thereafter completely filling the metal containers with the vacuumized apples and liquid so that no free air space is left therein, sealing the same and processing.

5. The method of preventing pin-holing of tinned receptacles holding food products packed therein; comprising subjecting the food product to a vacuum while immersed in a liquid in which it is to be preserved, whereby substantially all free air contained in the food products is abstracted therefrom, thereupon completely filling the receptacles so that no free air is left therein and sealing the same.

6. The method of preventing pin-holing of tinned receptacles holding food products packed therein, comprising vacuumizing the food product and thereby abstracting therefrom substantially all free air or oxygen contained in the food product, completely filling such receptacle with said vacuumized food product and a preserving liquid so that no free air space is left therein, and hermetically sealing the receptacle.

In testimony whereof I affix my signature.

WILLIAM STEVEN SELLARS.